US007640214B2

(12) United States Patent
Black et al.

(10) Patent No.: US 7,640,214 B2
(45) Date of Patent: Dec. 29, 2009

(54) ADVERTISING TERMINAL

(75) Inventors: Jonathan S. Black, Dundee (GB); Martin R. Smith, Dundee (GB); Derek Zuckert, Edinburgh (GB)

(73) Assignee: NCR Corporation, Dayton, OH (US)

( * ) Notice: Subject to any disclaimer, the term of this patent is extended or adjusted under 35 U.S.C. 154(b) by 1115 days.

(21) Appl. No.: 10/101,574

(22) Filed: Mar. 20, 2002

(65) Prior Publication Data

US 2002/0138433 A1 Sep. 26, 2002

(30) Foreign Application Priority Data

Mar. 21, 2001 (GB) ................. 0107044.0

(51) Int. Cl.
*G06Q 40/00* (2006.01)
(52) U.S. Cl. .......................... 705/43; 705/14
(58) Field of Classification Search ................. 705/14, 705/43
See application file for complete search history.

(56) References Cited

U.S. PATENT DOCUMENTS

| 5,305,195 | A  | * | 4/1994  | Murphy .......................... 705/1 |
| 6,199,754 | B1 | * | 3/2001  | Epstein ........................ 235/379 |
| 6,334,109 | B1 | * | 12/2001 | Kanevsky et al. ............. 705/14 |
| 6,381,626 | B1 | * | 4/2002  | De Leo et al. ............... 709/200 |
| 6,463,585 | B1 | * | 10/2002 | Hendricks et al. ............ 725/35 |
| 6,922,672 | B1 | * | 7/2005  | Hailpern et al. ............... 705/14 |
| 6,931,254 | B1 | * | 8/2005  | Egner et al. .............. 455/456.3 |
| 7,039,600 | B1 | * | 5/2006  | Meek et al. .................... 705/14 |
| 2001/0051922 | A1 | * | 12/2001 | Waller et al. .................. 705/43 |
| 2002/0026419 | A1 | * | 2/2002  | Maritzen et al. .............. 705/41 |
| 2003/0088463 | A1 | * | 5/2003  | Kanevsky et al. ............. 705/14 |

FOREIGN PATENT DOCUMENTS

| EP | 0 797 368 A2 | 9/1997 |
| WO | WO 96/30864 | 10/1996 |
| WO | WO 98/44477 | 10/1998 |
| WO | WO 00/19620 | 4/2000 |

* cited by examiner

*Primary Examiner*—Jagdish N Patel
*Assistant Examiner*—Sara Chandler
(74) *Attorney, Agent, or Firm*—Gregory A. Welte

(57) ABSTRACT

An advertising terminal (12) and a network of advertising terminals are described. The advertising terminal may be an ATM (12b). The ATM (12b) comprises a transceiver (80) for wireless communication with portable devices (26,28) in the vicinity of the ATM (12b). The ATM (12b) is operable to create a profile of persons in the vicinity of the ATM (12b) by detecting portable devices such as PDAs (26) and cellphones (28) that have a wireless communications facility (26a,28a) and identifying the owners of the portable devices. The ATM is also operable to display an advertisement appropriate for the created profile of persons.

2 Claims, 2 Drawing Sheets

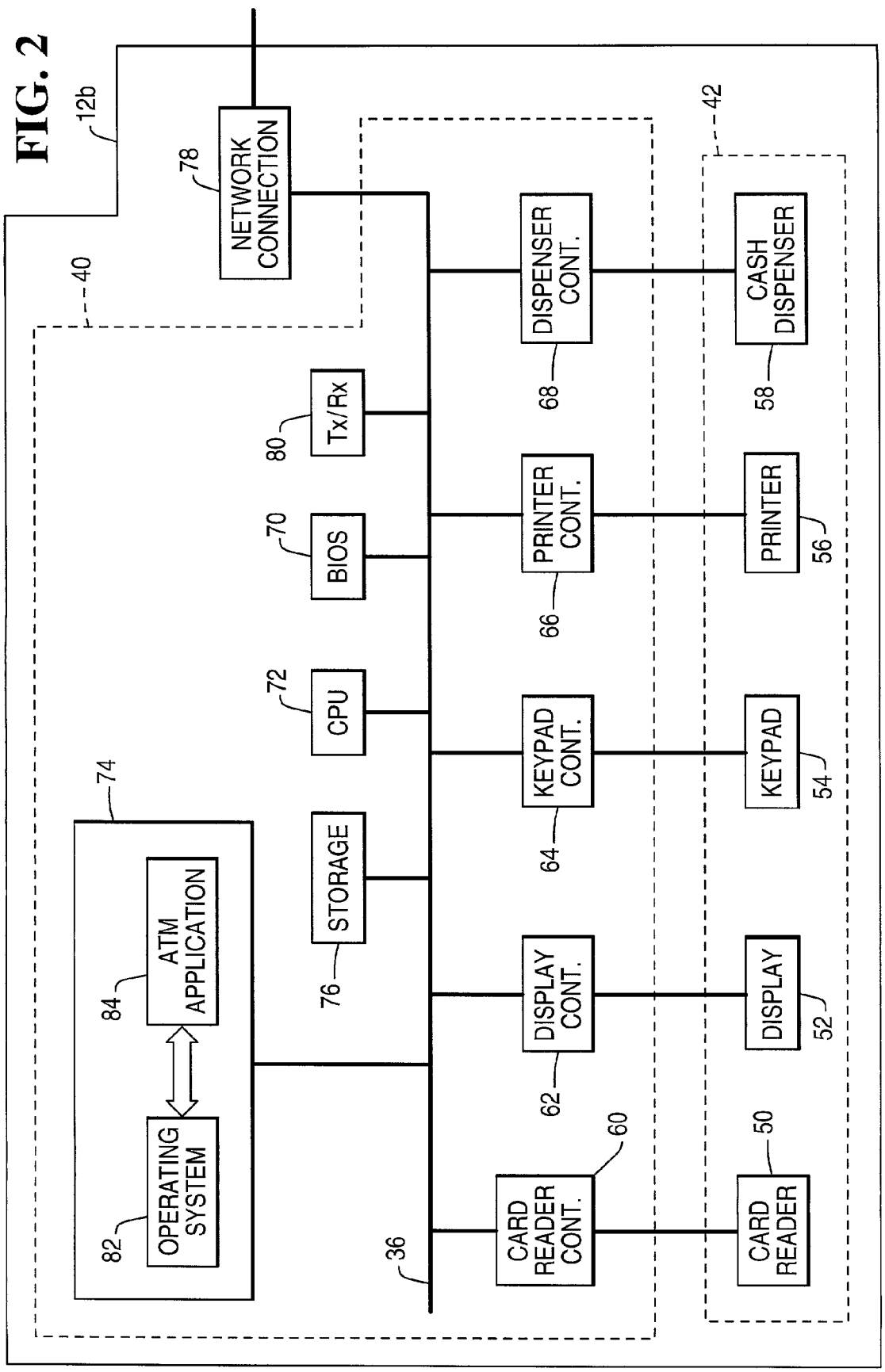

ADVERTISING TERMINAL

BACKGROUND OF THE INVENTION

The present invention relates to an advertising terminal and to a method of displaying advertisements. In particular, the invention relates to a self service terminal (SST), such as an automated teller machine (ATM), for displaying advertisements, and to a method of operation of such an SST. More specifically, the invention relates to an ATM for detecting portable devices having a wireless communication facility.

ATMs are public access terminals that provide users with a convenient source of cash and other financial transactions and services. An ATM is typically located in an area of high pedestrian traffic so that there is a large number of potential users of the ATM. This ensures that many ATM sites are ideal for advertising to passers by and to users of the ATM.

At present, advertising that is presented to a user may be customized to that individual, but advertising that is presented during the period between successive users of an ATM is typically a generic advertisement (that is, not targeted at a specific group of people) because the ATM cannot identify who is passing by the ATM. In general, an ATM owner or advertising coordinator is able to charge less for a generic advertisement than for an advertisement targeted at the people who view the advertisement. This means that an ATM owner would like to provide a high ratio of targeted advertisements to generic advertisements to maximize the income from advertising.

To enable targeting of advertising, demographic studies are sometimes performed by consultants to evaluate the demographic profile of those who live and work in the vicinity of an ATM; however, this is an expensive and time consuming exercise that has to be performed for each ATM site that is to be used for targeted advertising.

SUMMARY OF THE INVENTION

It is among the objects of an embodiment of the present invention to obviate or mitigate one or more of the above disadvantages or other disadvantages associated with advertising terminals.

According to a first aspect of the present invention there is provided an advertising terminal comprising a transceiver for wireless communication with portable devices in the vicinity of the terminal, where the terminal is operable to create a profile of persons in the vicinity of the terminal by detecting portable devices, and to display an advertisement appropriate for the created profile of persons.

In one embodiment, when creating a profile of persons in the vicinity of the terminal, the terminal may identify the owners of the portable devices.

In another embodiment, when creating a profile of persons in the vicinity of the terminal, for each detected portable device, the terminal may access an anonymized database using an identifier associated with the detected portable device.

In yet another embodiment, when creating a profile of persons in the vicinity of the terminal, the terminal may identify each type of portable device detected, and predict what type of persons are present based on the types of portable devices detected. For example, the terminal may target an advertisement at the type of person who might own a particular brand and model of cellular radiotelephone.

The profile of persons relates to demographic groupings to which the persons belong. For example, one demographic grouping may be young male, another demographic grouping may be middle age female, and such like. The demographic groupings may be very simple, such as the two examples given above (young male and middle age female). Alternatively, the demographic groupings may be very complex and may include details such as income band, lifestyle, type of occupation, and such like. A profile may include the numbers of people within each demographic grouping.

By virtue of this aspect of the invention an advertising terminal is able to display an advertisement targeted at the type of people who are, or who are typically, in the vicinity of the terminal.

The terminal may be an SST such as an ATM or a non-cash kiosk.

The terminal may include an additional display for presenting advertisements to passers by.

The terminal may create a profile of persons in the vicinity of the ATM over an extended period, such as an hour, a week, or a month, so that an advertisement is selected on the basis of the most common type of person in the vicinity of the ATM. In areas where the profile of persons changes dramatically throughout a day, a profile may be created for each hour of the day, or for particular hours such as 7 am to 9 am, 12 noon to 2 pm, and 5 pm to 7 pm.

The profile of persons may be created with the assistance of customer relationship management software. Owners of portable devices may register with an owner of the terminal so that the owners can be identified by the terminal. The owners of the terminal may store other information about the owners, for example financial information such as details of transactions, purchases, and such like.

According to a second aspect of the present invention there is provided an advertising terminal network comprising at least one advertising terminal having a transceiver for wireless communication with portable devices in the vicinity of the terminal, and a data store in communication with the at least one advertising terminal, whereby the advertising terminal is operable to detect portable devices in the vicinity of the terminal, to communicate with the data store to identify the owners of the portable devices, to create a profile of the identified owners, and to display an advertisement targeted at the identified owners.

According to a third aspect of the present invention, there is provided a method of operation of a self service terminal (SST), the method comprising the steps of: detecting one or more characteristics of a portable device in the vicinity of the terminal; selecting an advertisement to be presented based on the detected one or more characteristics; and displaying the selected advertisement.

This aspect of the present invention allows an SST to select and display an advertisement in response to some characteristic of a detected mobile device.

The detection step may make use of any appropriate technology. It is intended that broadcast wireless communications technology will be used in the present invention (for example, that known by the trade mark 'Bluetooth'); such technologies allow for communication between devices to be established without requiring any mutual alignment of the devices. Thus, a mobile device may broadcast some signal generally to all devices in the vicinity; this signal can be detected by all suitable devices in the vicinity. No specific point-to-point communication is necessary. Such broadcast wireless technology is particularly suited to use in the present invention. Of course, other forms of communication may be used, provided that some characteristic of a mobile device may be detected by an SST. The 'vicinity' of an SST, as used herein, will depend on the type of communications technology used; it is however intended that devices within a radius of approximately three meters of an SST may be detected. The precise figure used will also be dependent on the application to which the method is to be put.

The characteristic detected may reflect the identity of the user. For example, a PDA may be programmed to broadcast a user's 'digital signature', that is, a unique code identifying the individual to suitably-equipped devices. Where the identity of a user is detected, the method may comprise the further step of retrieving a user profile for that identity from a remote location. For example, the SST operator may maintain a database of user profiles reflecting the known preferences of each user. On detection of a user's identity, the SST may retrieve this profile from the remote database. A digital signature broadcast by a particular device may include information relating not only to the identity of the user, but also to the particular type or capabilities of the device.

The characteristic detected may reflect the identity of the portable device.

Selection of an advertisement may involve selecting an advertisement from a master list. The master list may be arranged so that one advertisement is recommended for each demographic group.

Advertisements may be displayed based on the interests of a user as recorded in their user profile. The advertisements may be displayed to individuals either when using the SST, or to individuals waiting in a queue, or walking by the SST.

Users may also register their mobile devices with the SST operator. This may allow the SST operator to send advertisements or information to a user's device even when the user is not making use of an SST.

It will now be appreciated that these embodiments have the advantage that advertisements may be automatically selected to suit a demographic group in the vicinity of an advertising terminal. In addition, the terminal is able to determine the demographic profile of persons in the vicinity of the terminal, thereby avoiding the need for a demographic study to be performed by a consultant. The terminal is also able to monitor continually the profile of persons in the vicinity of the terminal so that the terminal is able dynamically to change the advertisement to suit any change in the profile of persons. The terminal owner is also able to charge an advertiser on a per advert displayed basis.

According to a fourth aspect of the present invention there is provided an advertising terminal comprising a transceiver for wireless communication with portable devices in the vicinity of the terminal, where the terminal is operable to transmit information to portable devices carried by passers by, where the information relates to goods and/or services available locally to the terminal.

The terminal may be an SST, such as an ATM. An owner of a portable device may have to subscribe to an information service before the owner receives information from the terminal.

The information may be an advertisement, a discount coupon, or such like.

The portable device may transmit a receipt to the terminal. The terminal may use the receipt to charge an information provider for providing the owner of the portable device with the information.

BRIEF DESCRIPTION OF THE DRAWINGS

These and other aspects of the present invention will now be described, by way of example only, with reference to the accompanying drawings, in which:

FIG. 2 is a block diagram of an advertising terminal forming part of the network of FIG. 1.

DETAILED DESCRIPTION

Figure 1:
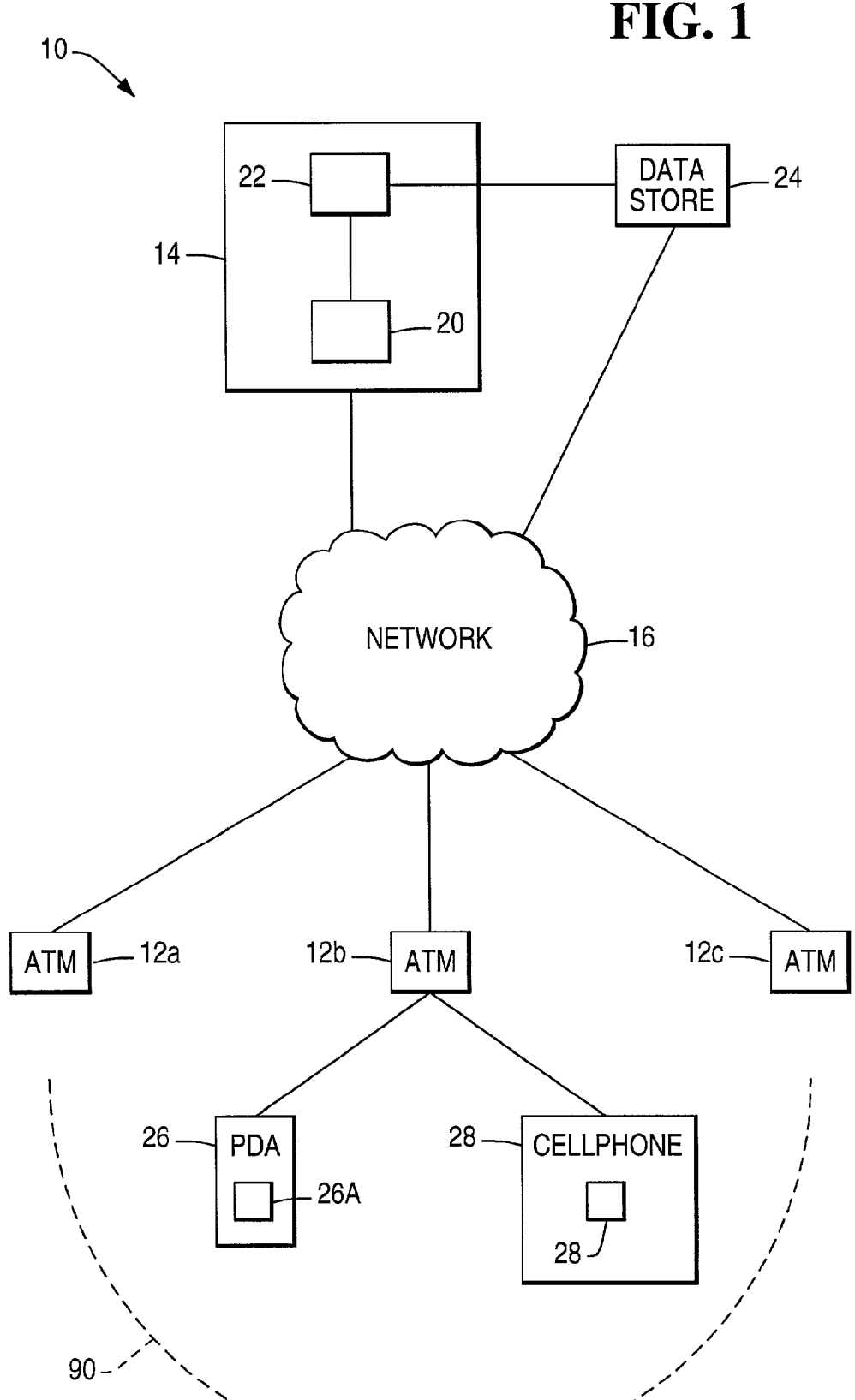
FIG. 1 is a block diagram of an advertising network according to one embodiment of the present invention.

Referring to FIG. 1, an advertising network 10 (in the form of an ATM network) is owned and operated by a financial institution and comprises a plurality of advertising terminals 12 (in the form of ATMs) connected to a host 14 via a network 16.

The host 12 includes an authorization facility 20 and a back-office facility 22.

The authorization facility 20 authorizes transaction requests received from ATMs 12 via the network 16. The authorization facility 20 also authorizes transaction requests received from Point of Sale terminals (not shown) and other ATM networks (not shown).

The back-office facility 22 maintains records for every account maintained by the financial institution. Each record includes a list of all the transactions (for example direct credits, direct debits, checks, withdrawals, and such like) executed relating to that account. The back-office facility 22 provides (typically on a daily basis) the transaction authorization facility 20 with account information for each account maintained by the financial institution.

The ATMs 12 are also connected to a remote data store 24 via the network 16. The ATMs 12 are identical and physically remote from each other, but are shown in proximity in FIG. 1 for clarity.

FIG. 1 also shows two portable devices 26,28 in the vicinity of one of the ATMs 12b. The first portable device 26 is a personal digital assistant (PDA) and is carried by a first pedestrian (not shown), the second device 28 is a cellular radiotelephone (hereinafter referred to as a cellphone) and is carried by a second pedestrian (not shown). Each portable device 26, 28 has a wireless communication facility 26a, 28a, in this embodiment a Bluetooth (trademark) module.

The owners of the devices 26, 28 have registered with the owner of the ATM network 10, and the ATM network owner stores demographic information relating to registered owners in the data store 24.

For each registered owner, the data store 24 stores the owner's Bluetooth module identification and demographic information about the owner. This demographic information may include details of the device owner's gender, age, lifestyle, and such like. In this embodiment, the demographic information is simplified by having a predefined set of groups (one group for a young affluent male, another group for a young affluent female, a third group for a middle age affluent male, and such like), where each group has an identification code and each device owner is allocated a group identification code corresponding to the group that most closely defines the device owner's demographic profile. The data stored in the data store may be anonymized so that, for example, the registered owner's name and address is not stored.

Reference is now made to FIG. 2, which is a simplified block diagram of the architecture of the ATM 12b of FIG. 1. A system bus (or a plurality of system buses) 36 interconnects various modules in an ATM controller 40 to allow mutual intercommunication, as will be described in more detail below.

User associated modules 42 comprise the following elements (peripheral devices): a token reader 50 in the form of a card reader, a display 52, an encrypting keypad module 54, a printer 56, and a cash dispenser 58.

The controller 40 comprises modules for driving the user associated modules 42, namely: card reader controller 60, display controller 62, keypad controller 64, printer controller 66, and dispenser controller 68. These user associated modules (50 to 58) and drivers (60 to 68) are standard modules that are used in conventional ATMs and will not be described in detail herein.

The controller 40 also comprises a BIOS 70 stored in non-volatile memory, a microprocessor 72, associated main memory 74, storage space 76 in the form of a magnetic disk drive, a dedicated network connection 78 for connecting the ATM 12*b* to the transaction host 14 (FIG. 1) via the network 16, and a wireless transceiver 80 in the form of a Bluetooth (trade mark) module.

In use, the main memory 74 is loaded with an ATM operating system kernel 82, and an ATM application 84. As is well known in the art, the operating system kernel 82 is responsible for memory, process, task, and disk management. The ATM application 84 is responsible for controlling the operation of the ATM 12*b*.

The magnetic disk drive 76 also stores a selection of advertisements, each advertisement being associated with a demographic group identification code so that each group identification code has a corresponding advertisement.

While the ATM 12*b* is operating, the wireless transceiver 80 constantly monitors the area in the immediate vicinity of the ATM 12*b* (approximately 10 m radius as illustrated by arc 90 in FIG. 1) for portable devices having a complementary wireless transceiver (that is, another Bluetooth module).

As illustrated in FIG. 1, the ATM's transceiver 80 will detect the PDA's Bluetooth module 26*a* and the cellphone's Bluetooth module 28*a*. Each module 26*a*, 28*a* has a unique identification. The transceiver 80 receives these two identifications and conveys them to the ATM application 84.

For each unique identification received, the ATM application 84 uses the network connection 78 and the network 16 to access the data store 24 to determine the demographic group to which the device owner belongs. In this embodiment the demographic group is a group identification code. The ATM application 84 then stores each retrieved demographic group code. At the end of a preset time period (or when a predetermined number of demographic group codes have been retrieved), the ATM application 84 creates a profile of persons in the vicinity of the ATM 12*b*. This is achieved by the ATM application 84 determining the most commonly retrieved demographic group identification code.

The ATM application 84 then accesses the magnetic disk drive 76 to select the advertisement associated with the most commonly retrieved demographic group identification code. The ATM application 84 displays this selected advertisement when the ATM 12*b* is not being used. Thus, passers by will see an advertisement that reflects the most commonly detected demographic group in the vicinity of that ATM 12*b*. The ATM application 84 stores a record of which advertisements were displayed so that the ATM network owner can charge for displaying the advertisements.

As the ATM 12*b* continually monitors the Bluetooth modules in the vicinity of the ATM 12*b*, the advert that is displayed may be changed if the demographic group of passers by changes.

In another mode of operation, the transceiver 80 transmits advertisements relating to local merchants or local facilities or services to the portable devices 26, 28 to inform the owners of the portable devices 26, 28 about events or offers in the vicinity of the ATM 12*b*. This may only occur if the data store entry for that portable device indicates that the device owner wishes to receive such advertisements from an ATM.

Various modifications may be made to the above described embodiment within the scope of the present invention, for example, a wireless transceiver other than a Bluetooth module may be used. In other embodiments the advertising terminal may be a non-cash kiosk.

What is claimed is:

1. A method of operating an automated teller machine (ATM), comprising the steps of:
    a) receiving at the ATM a signal automatically transmitted from a device carried by person who is
        i) in the vicinity of the ATM and
        ii) not using the ATM;
    b) based on the signal, or information received from the device, or both, classifying at the ATM the person into a demographic group;
    c) based on the demographic group, at the ATM selecting advertising from a collection of advertising; and
    d) displaying the selected advertising at the ATM.

2. Method according to claim 1, and further comprising the step of:
    d) dispensing cash from a cash dispenser at a time when an advertisement is not being displayed on the ATM.

* * * * *

UNITED STATES PATENT AND TRADEMARK OFFICE
CERTIFICATE OF CORRECTION

| | | |
|---|---|---|
| PATENT NO. | : 7,640,214 B2 | Page 1 of 1 |
| APPLICATION NO. | : 10/101574 | |
| DATED | : December 29, 2009 | |
| INVENTOR(S) | : Black et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1577 days.

Signed and Sealed this

Twenty-first Day of December, 2010

David J. Kappos
*Director of the United States Patent and Trademark Office*